3,434,286
PRESSURE FAILURE WARNING DEVICE
Sheldon F. Raizes, Marshallton, Del., assignor to The
Bendix Corporation, a corporation of Delaware
Filed Sept. 29, 1967, Ser. No. 671,676
Int. Cl. F15b 7/00; B60t 11/10; H01h 3/02
U.S. Cl. 60—54.5    8 Claims

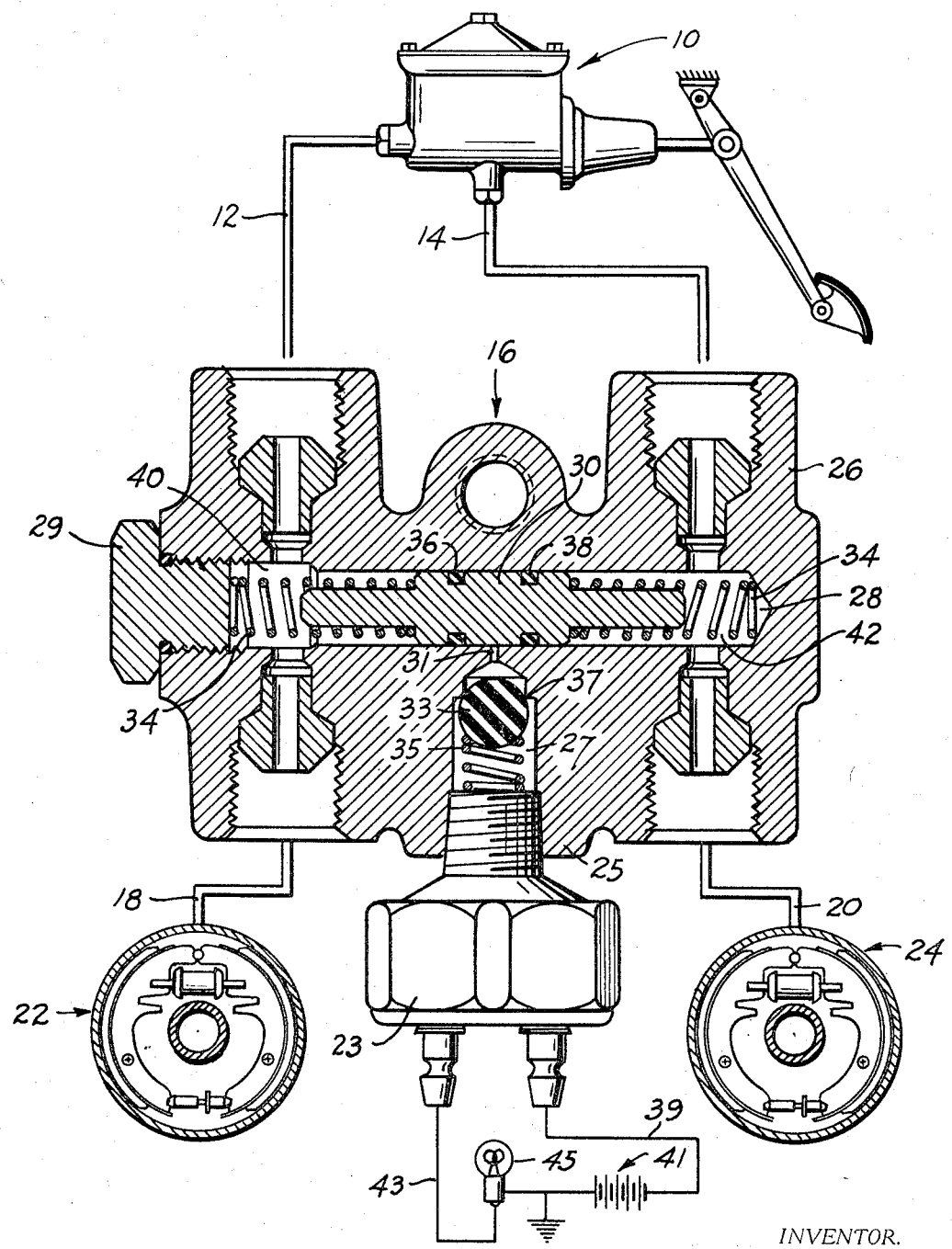

ABSTRACT OF THE DISCLOSURE

A warning device including a piston valve operatively positioned between separate hydraulic pressure circuits which valve has seals operatively related to an interposed port so that a pressure differential will communicate the higher pressure to a chamber within which a hydraulic stoplight switch is operatively related which chamber has means to trap the pressure introduced therein to maintain the operation of the switch after it has been actuated.

SUMMARY

In a vehicle having a split system master cylinder, two separate fluid systems connect the master cylinder to a respective set of brakes for simultaneously actuating the same. When one set of brakes fail, the other set of brakes still operate. While there is a pedal loss in most instances and a vehicle operator must press harder on the brake pedal to stop the vehicle, it is not assured that the operator will realize that he has lost one set of brakes.

Many attempts have been made in the prior art to come up with a warning device to provide a visual indication to the operator of the aforementioned failure such as U.S. Patent No. 3,228,194, assigned to the common assignee and U.S. patent application Ser. No. 500,782, filed Oct. 22, 1965, and also assigned to the common assignee of this application. There have been other related prior art attempts to deal with this problem such as is embodied in the U.S. Patent No. 2,965,730 wherein means are provided to cut off hydraulic communication to the failed side of the brake system and at the same time introduce fluid pressure to a stoplight type of switch to actuate an indicator.

It is therefore the intention of this invention to improve upon these systems by providing a more economical and practical switch.

DRAWING DESCRIPTION

The single sheet of drawings shows a schematic view of a split brake system illustrating a warning device in accordance with the principles of this invention in cross section.

DETAILED DESCRIPTION

Referring to the drawing, a well known split system master cylinder 10, such as the type illustrated and described in U.S. Patent No. 3,149,468 is shown in full. A pair of conduits 12 and 14 connect a respective one of a pair of actuating chambers of the master cylinder with a valve 16, and conduits 18 and 20 connect the valve 16 with a front brake means 22 and a rear brake means, 24 respectively.

The valve 16 comprises a housing 26 having a bore 28 therein being closed at one end and opened at the other end and provided with threads for the receipt of a plug 29. A well known fluid actuated switch 23 is secured in a boss 25 and is communicated to a chamber 27 opening by means of the cross drilled passage 31 to the bore 28. However, prior to assembly of the switch 23, which to those skilled in the art to which this invention relates is simply a hydraulically actuated stoplight switch, a ball valve 33 and spring 35 are assembled within the chamber 27 to bear upon shoulder 37 of the housing 26 due to the compressive action of the spring 35 between the switch 23 and the resilient ball valve 33.

The switch 23 is connected by means of an electrical lead 39 to a power source 41 such as the battery of the vehicle, and by an electrical lead 43 to a light bulb 45 so that whenever the switch 23 is closed the electrical circuit from the battery is completed to illuminate the bulb 45.

Prior to the assembly of the plug 29 to the housing 26 to close the bore 28 a piston 30, having centering springs 32 and 34 and spaced O-ring seals 36 and 38, is placed within the bore so that the spaced seals 36 and 38 are equidistantly positioned to the right and left of the cross drilled passage 31.

OPERATION

In operation, when the master cylinder 10 is actuated, and the braking system is intact, separate, proportional, if not equated, braking pressure is communicated by conduits 12 and 14 from the master cylinder 10 to the front brake means 22 and the rear brake means 24 via the front brake chamber 40 and the rear brake chamber 42 to either side of the piston 30 in the housing 26. So long as the pressures within the chambers 40 and 42 approximate the condition called for in the design of the braking system, the piston 30 will be immovable within the bore 38.

However, assuming there has been a leakage in the side of the brake system leading to the front brake means 22, the piston 30 will be forced to the left, as viewed in the drawing, whereby the seal 38 uncovers the passage 31 and the pressure in the chamber 42 is communicated to the chamber 27, after displacing the ball valve 33 from the seat 37. Once the pressure in the chamber 27 approximates that within the chamber 42 the valve 33, due to the spring 35 will again seat on the shoulder 37 to trap pressure in the chamber between the valve 33 and the switch 23 holding the switch in an actuated condition even when the braking pressure in the chamber 42 is released.

The switch 23, as mentioned previously, is a simple stoplight switch having contacts which are closed by hydraulic pressure to make a connection between the electrical lead 39 and the electrical lead 43 whereby the bulb 45 is illuminated. Normally the bulb 45 is located within visual range of the operator of the vehicle so that its illumination will become readily obvious to the operator and he will be apprised that a failure has occurred in the system. The necessity for keeping the bulb illuminated is that this will hopefully become a point of annoyance that will require servicing of the brake system.

It should be understood that, as the rear brake side of the brake system fails, the operation of the switch 23 will be exactly the same as mentioned above in that the piston 30 will move to the right instead of the left to open the passage 31 to the chamber 40.

Having fully described an operative construction of my invention it is now desired to set forth the scope of coverage sought by these Letters Patent in the appended claims.

I claim:
1. A valve for use in a split brake system having a master cylinder providing separate braking pressures, which valve comprises:
   a housing having a bore therein, a piston member within said bore dividing said bore into separate variable volume chambers with a first seal means facing one of said variable volume chambers and a second seal means spaced from said first seal means facing the other of said variable volume chambers;
   a switch means operatively connected to said housing via a passage means open to said bore normally lo- cated between said first and second seal means of said piston; and a valve means within said passage means for said switch means normally closing communication between said bore and said switch.

2. A valve according to claim 1 wherein said valve means is characterized as a spring biased ball valve operatively engaging a shoulder between said passage means and said bore.

3. A valve according to claim 1 wherein said valve means includes a resilient element to facilitate seating to trap pressure in said passage means after one or the other of the first or second seal means is moved to expose one of said chambers to said passage means.

4. A valve according to claim 2 wherein said ball valve is a resilient element operatively connected to a spring between it and said switch means.

5. A valve for use in a split brake system having a master cylinder providing separate braking pressures, which valve comprises:

a housing having an open-ended bore therein, said housing having a passage at right angles to said bore;

a piston means within said bore dividing said bore into separate variable volume chambers with a first seal means facing one of said variable volume chambers and a second seal means spaced from said first seal means facing the other of said variable volume chambers, said piston means being operatively connected to said housing by means biasing it so that the first and second seals are located adjacent said passage to either side thereof;

plug means closing said bore to regulate said means biasing said piston means;

a switch means operatively connected to said housing at said passage; and a valve means so constructed and located within said passage to be opened by pressure from said bore and closed as pressure equalizes thereacross to operate and hold the operation of said switch means.

6. A valve according to claim 5 wherein said valve means is characterized as a spring biased ball valve operatively engaging a shoulder in said passage.

7. A valve according to claim 5 wherein said valve means includes a resilient element to facilitate seating to trap pressure in said passage after one or the other of the first or second seal means is moved beyond said passage.

8. A valve according to claim 6 wherein said ball valve is a resilient element operatively connected to a spring between it and said switch means.

References Cited

UNITED STATES PATENTS

| | | |
|---|---|---|
| 2,563,168 | 8/1951 | Herriott. |
| 2,965,730 | 12/1960 | Regoli et al. _____ 200—82 |
| 3,228,194 | 1/1966 | Blair. |
| 3,358,446 | 12/1967 | Wortz. |

MARTIN P. SCHWADRON, *Primary Examiner.*

R. R. BUNEVICH, *Assistant Examiner.*

U.S. Cl. X.R.

188—152; 200—86; 137—112